United States Patent
Pogue

(10) Patent No.: US 11,260,894 B1
(45) Date of Patent: Mar. 1, 2022

(54) CARGO SLED ASSEMBLY

(71) Applicant: Jeffrey M. Pogue, Sequim, WA (US)

(72) Inventor: Jeffrey M. Pogue, Sequim, WA (US)

(*) Notice: Subject to any disclaimer, the term of this patent is extended or adjusted under 35 U.S.C. 154(b) by 0 days.

(21) Appl. No.: 17/077,431

(22) Filed: Oct. 22, 2020

(51) Int. Cl.
  *B62B 15/00* (2020.01)
  *B62B 17/06* (2006.01)

(52) U.S. Cl.
  CPC .......... *B62B 15/007* (2013.01); *B62B 17/061* (2013.01)

(58) Field of Classification Search
  CPC ..... B62B 15/007; B62B 15/00; B62B 17/061; B62B 13/00; B62B 13/02; B62B 13/04; B62B 13/06; B62B 13/16; B62B 13/18
  See application file for complete search history.

(56) References Cited

U.S. PATENT DOCUMENTS

| | | | |
|---|---|---|---|
| 2,551,906 A * | 5/1951 | Schaffhausen, Sr. | ... B62B 17/08 280/18.1 |
| 2,670,969 A * | 3/1954 | Costikyan | ............. B62B 5/0083 410/51 |
| 2,974,971 A * | 3/1961 | Buck | ....................... A01G 20/43 280/19 |
| 3,938,819 A | 2/1976 | Martin | |
| 4,173,351 A | 11/1979 | Hetland | |
| 4,593,841 A * | 6/1986 | Lange | ....................... A45C 9/00 224/153 |
| 5,104,133 A | 4/1992 | Reiner | |
| 5,211,434 A | 5/1993 | Lanava | |
| D356,981 S | 4/1995 | Bennett | |
| 8,720,462 B2 * | 5/2014 | Vieira | ....................... B25G 1/02 135/118 |
| 9,487,226 B2 * | 11/2016 | Coates | .................... B62B 13/06 |
| 10,029,722 B1 | 7/2018 | Springwater | |
| 10,479,154 B2 | 11/2019 | Butler | |

FOREIGN PATENT DOCUMENTS

WO  WO2005014367  2/2005

* cited by examiner

*Primary Examiner* — John D Walters

(57) ABSTRACT

A cargo sled assembly for facilitating a physically limited user to transport cargo includes a dish that has a rigid bottom wall to facilitate the dish to be dragged along a variety of support surfaces. The dish has a diameter of at least 40.0 inches to accommodate cargo such as yard debris or the like thereby facilitating the dish to transport the cargo. A pair of straps is each coupled to and extends laterally away from the dish. A rod is coupled between each of the straps and the rod can be gripped by a user thereby facilitating the user to drag the dish along the support surface. In this way the user can transport the cargo in the dish.

6 Claims, 6 Drawing Sheets

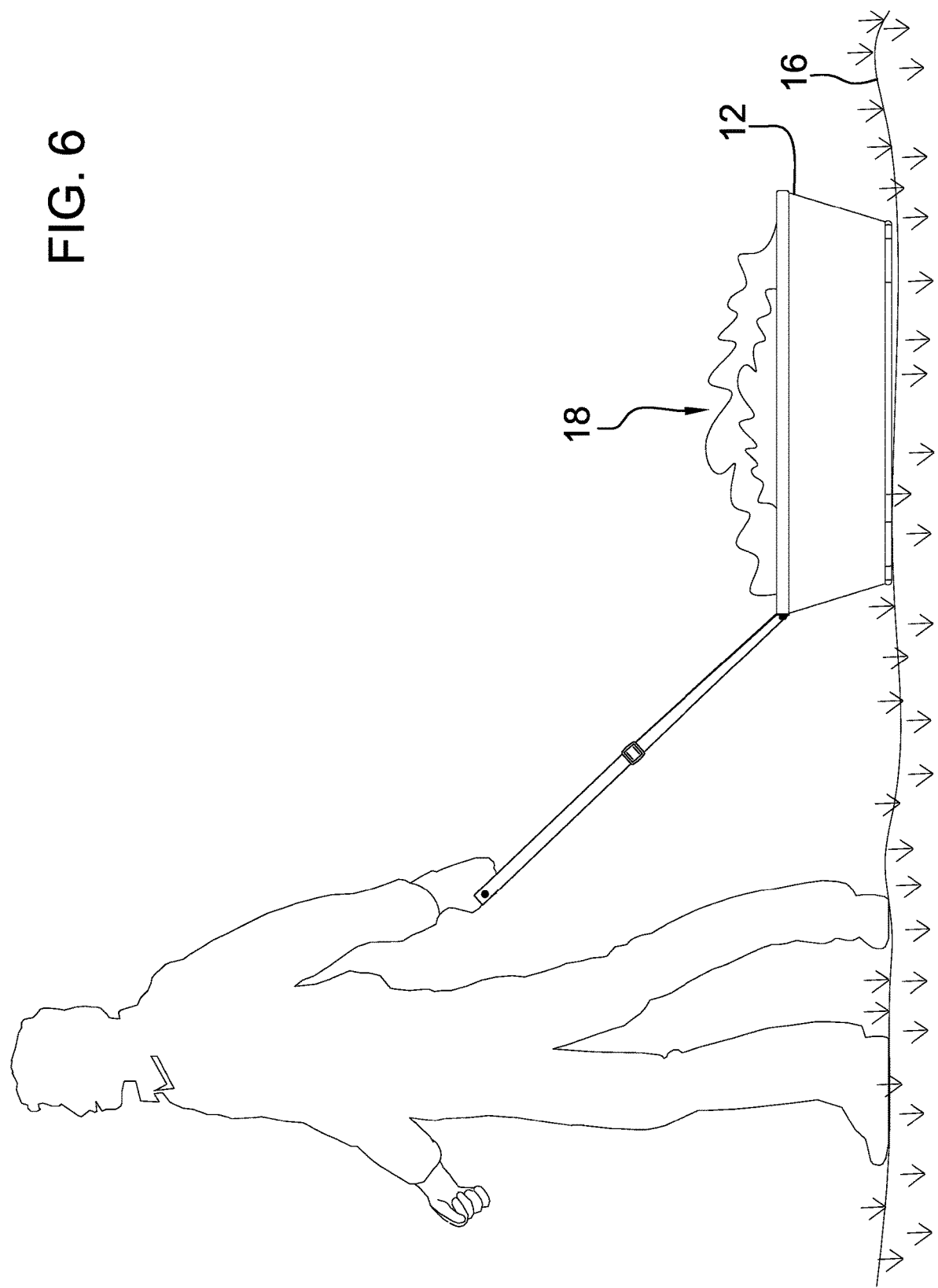

CARGO SLED ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sled devices and more particularly pertains to a new sled device for facilitating a physically limited user to transport cargo.

(2) Description of Related Art Including Information Disclosed Under 37 CFR 1.97 and 1.98

The prior art relates to sled devices including a cargo sled that has a sloped front wall for dragging cargo along a support surface. The prior art also discloses a variety litter sleds that each has an open front side for dragging cargo along a support surface. The prior art also discloses a variety of cargo sleds that comprise a panel that is bent into a sled shape for dragging cargo along a support surface.

BRIEF SUMMARY OF THE INVENTION

An embodiment of the disclosure meets the needs presented above by generally comprising a dish that has a rigid bottom wall to facilitate the dish to be dragged along a variety of support surfaces. The dish has a diameter of at least 40.0 inches to accommodate cargo such as yard debris or the like thereby facilitating the dish to transport the cargo. A pair of straps is each coupled to and extends laterally away from the dish. A rod is coupled between each of the straps and the rod can be gripped by a user thereby facilitating the user to drag the dish along the support surface. In this way the user can transport the cargo in the dish.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a perspective in-use view of an embodiment of the disclosure.

DETAILED DESCRIPTION OF THE INVENTION

Figure 1:
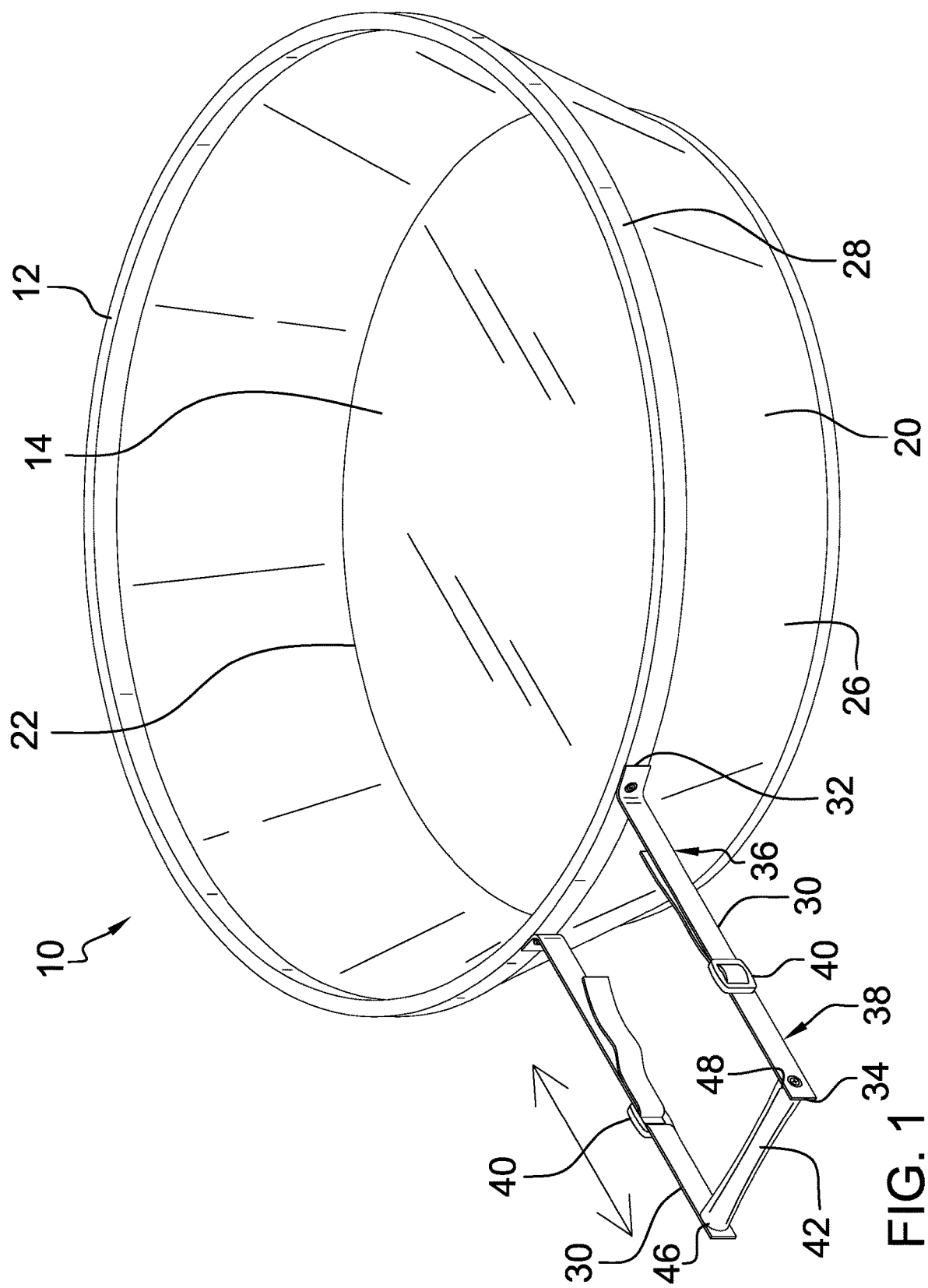
FIG. 1 is a perspective view of a cargo sled assembly according to an embodiment of the disclosure.
Figure 2:
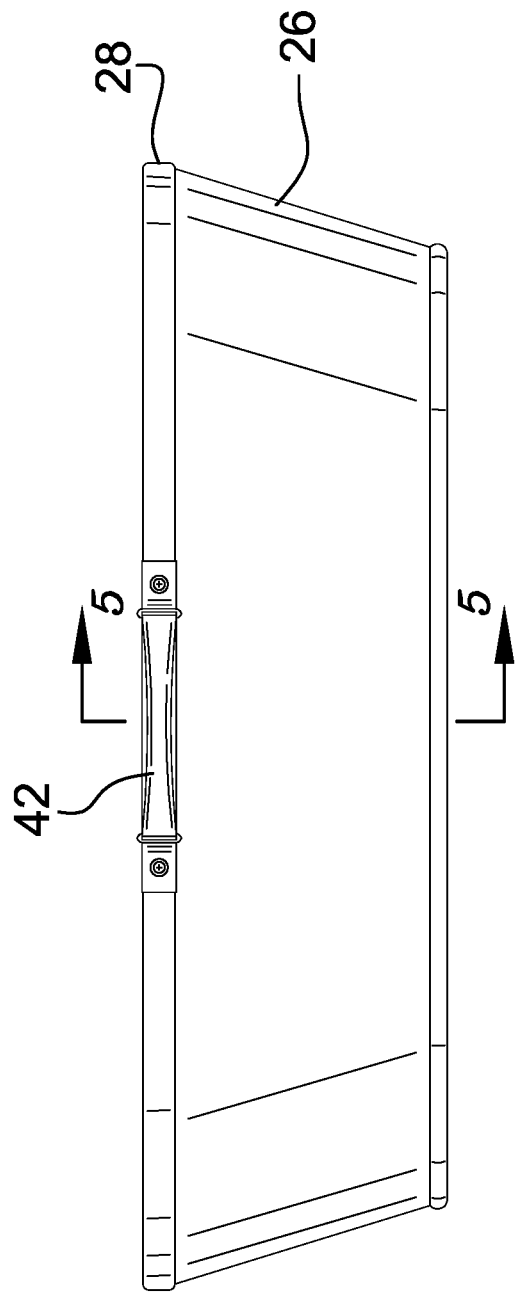
FIG. 2 is a front view of an embodiment of the disclosure.
Figure 3:
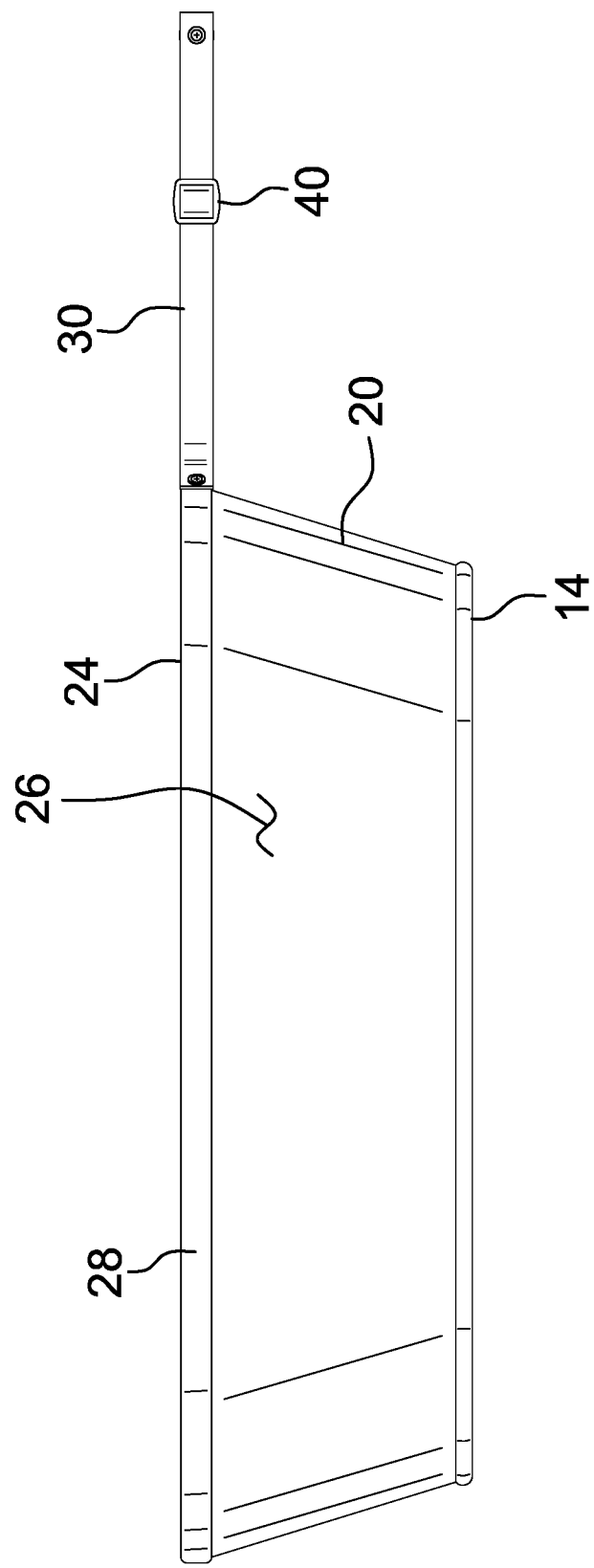
FIG. 3 is a right side view of an embodiment of the disclosure.
Figure 4:
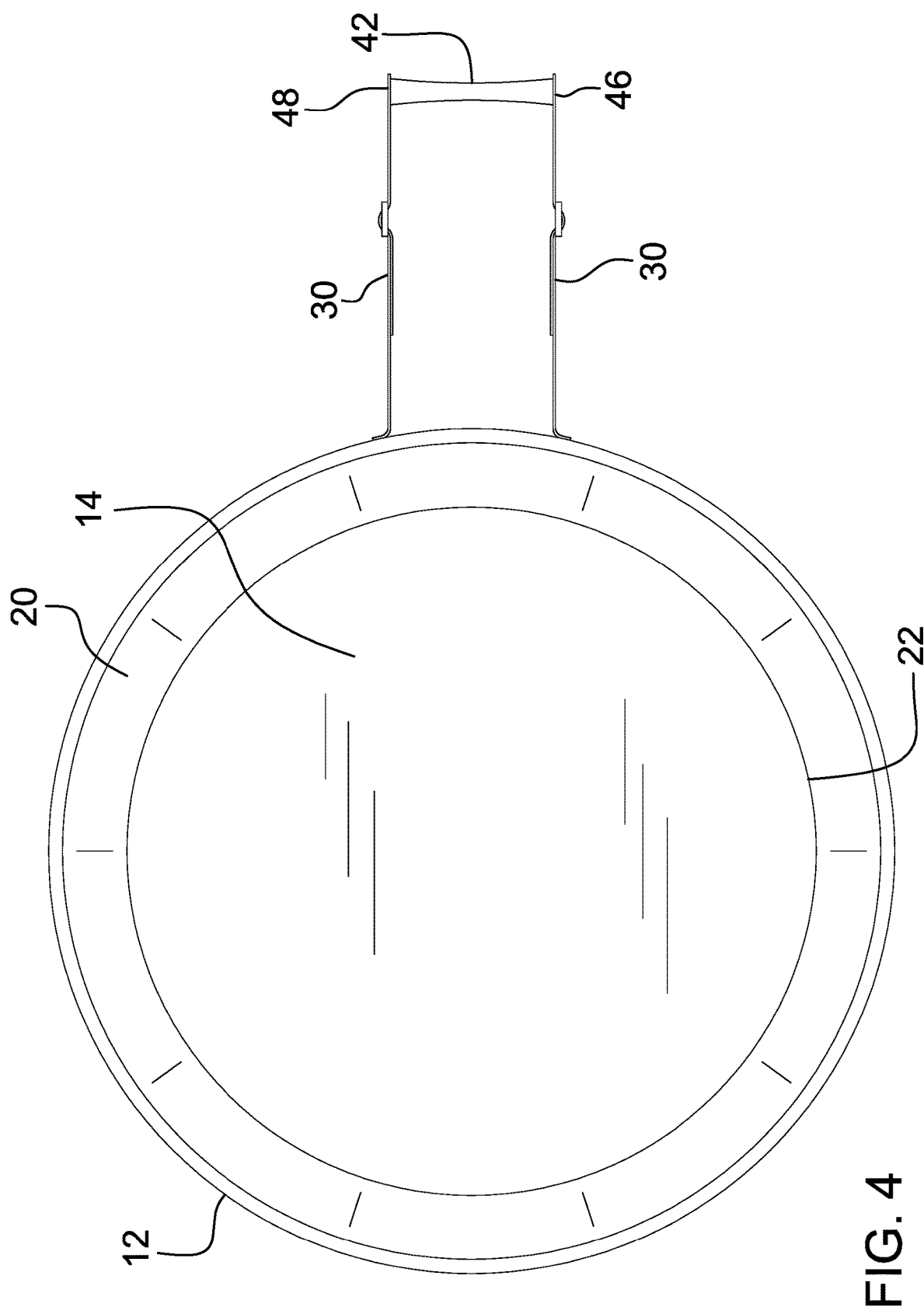
FIG. 4 is a top view of an embodiment of the disclosure.
Figure 5:
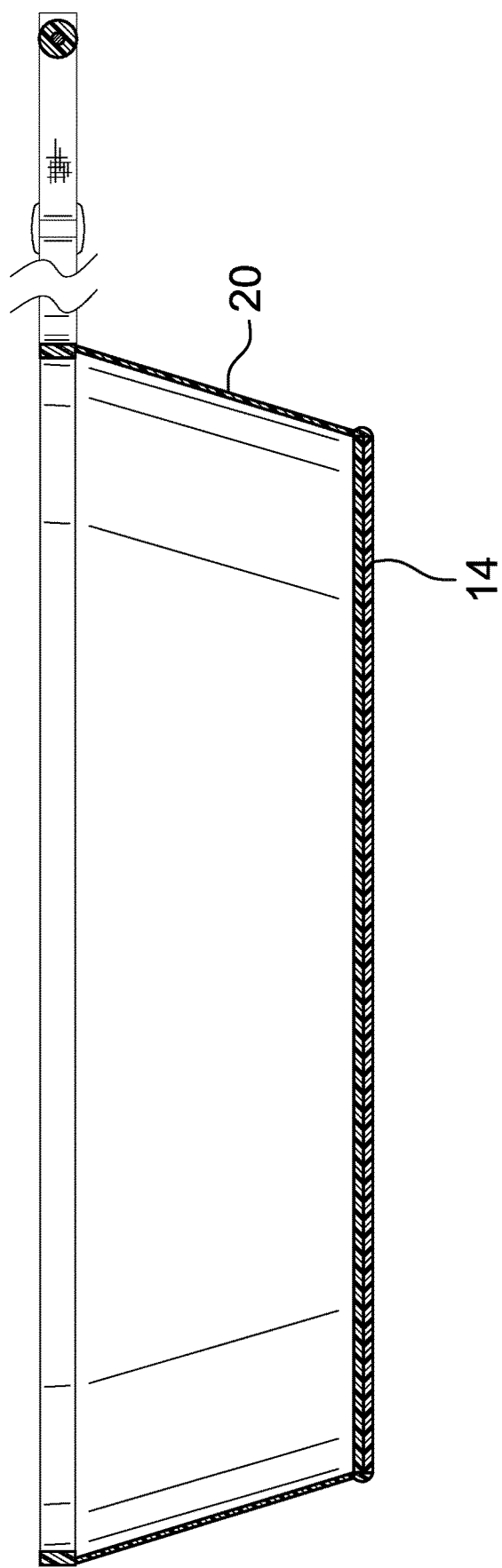
FIG. 5 is a cross sectional view taken along line 5-5 of FIG. 2 of an embodiment of the disclosure.

With reference now to the drawings, and in particular to FIGS. 1 through 6 thereof, a new sled device embodying the principles and concepts of an embodiment of the disclosure and generally designated by the reference numeral 10 will be described.

As best illustrated in FIGS. 1 through 6, the cargo sled assembly 10 generally comprises a dish 12 has a rigid bottom wall 14 to facilitate the dish 12 to be dragged along a variety of support surfaces 16. The rigid bottom wall 14 is comprised of a rigid material such as reinforced polyvinylchloride or other similar type of rigid and resilient material. The dish 12 has a diameter of at least 40.0 inches to accommodate cargo 18 such as yard debris or the like thereby facilitating the dish 12 to transport the cargo 18. The dish 12 has an outer wall 20 extending upwardly from a perimeter 22 of the rigid bottom wall 14. Moreover, the outer wall 20 has a distal edge 24 with respect to the rigid bottom wall 14 and the outer wall 20 has an outer surface 26. The outer wall 20 has a lip 28 extending outwardly from the outer surface 26, the lip 28 is aligned with the distal edge 24 and the lip 28 is coextensive with the distal edge 24. The outer wall 20 may have a height of at least 10.0 inches and the outer wall 20 angles outwardly between the distal edge 24 and the perimeter 22 of the rigid bottom wall 14.

A pair of straps 30 is provided and each of the straps 30 is coupled to and extends laterally away from the dish 12. Each of the straps 30 has a first end 32 and a second end 34, and each of the straps 30 has a first portion 36 and a second portion 38. The first end 32 is associated with the first portion 36 and the second end 34 is associated with the second portion 38. The first end 32 of each of the straps 30 is coupled to the lip 28 and the straps 30 are spaced apart from each other on the lip 28. A pair of buckles 40 is provided and each of the buckles 40 has the first portion 36 and the second portion 38 of a respective one of the straps 30 slidably extending therethrough. In this way the buckles 40 facilitate each of the straps 30 to have an adjustable length to accommodate preference of a user 44. Additionally, the straps 30 may be adjustable between a minimum length of approximately 60.0 inches and a maximum length of approximately 72.0 inches.

A rod 42 is provided that is coupled between each of the straps 30 such that the rod 42 can be gripped by a user 44 thereby facilitating the user 44 to drag the dish 12 along the support surface 16. In this way the cargo 18 can be transported over the support surface 16 without the need to employ a wheelbarrow or other device that the user 44 may not be capable of employing due to the user 44's physical limitations. The rod 42 has a primary end 46 and a secondary end 48, and each of the primary end 46 and the secondary end 48 is coupled to a respective one of the straps 30 at a point that is located adjacent to the second end 34 of the straps 30. The rod 42 may have a length of approximately 10.0 inches and the rod 42 flares outwardly adjacent to each of the primary end 46 and the secondary end 48 for enhancing comfort for gripping.

In use, the dish 12 is loaded with the cargo 18 and the straps 30 are adjusted to the preferred length. The rod 42 is gripped thereby facilitating the user 44 to drag the dish 12 along the support surface 16 for transporting the cargo 18. In this way the user 44 can transport the cargo 18 with the need to employ a wheelbarrow or other device that is beyond the user 44's physical ability. Thus, an elderly user 44 or a physically disabled user 44 can transport cargo 18 that they would otherwise be incapable of transporting.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo sled assembly for facilitating a user to drag cargo over a support surface, said assembly comprising:
    a dish having a rigid bottom wall wherein said bottom wall is configured to facilitate said dish to be dragged along a variety of support surfaces, said dish having an outer wall extending upwardly from said rigid bottom wall, said dish having a diameter of at least 40.0 inches wherein said dish is configured to accommodate cargo thereby facilitating said dish to transport the cargo, said rigid bottom wall comprises two adjacent layers, a perimeter edge of said rigid bottom wall being rounded extending around said rigid bottom wall, said perimeter edge protruding outwardly from a base of said outer wall;
    a pair of straps, each of said straps being coupled to and extending laterally away from said dish; and
    a rod being coupled between each of said straps wherein said rod is configured to be gripped by a user thereby facilitating the user to drag said dish along the support surface for transporting the cargo in said dish.

2. The assembly according to claim 1, wherein said outer wall having a distal edge with respect to said rigid bottom wall and an outer surface, said outer wall having a lip extending outwardly from said outer surface, said lip being aligned with said distal edge, said lip being coextensive with said distal edge.

3. The assembly according to claim 2, wherein each of said straps has a first end and a second end, each of said having a first portion and a second portion, said first end being associated with said first portion, said second end being associated with said second portion, said first end of each of said straps being coupled to said lip, said straps being spaced apart from each other on said lip.

4. The assembly according to claim 3, further comprising a pair of buckles, each of said buckles having said first portion and said second portion of a respective one of said straps being slidably extended therethrough thereby facilitating each of said straps to have an adjustable length wherein said pair of buckles is configured to accommodate preference of a user.

5. The assembly according to claim 3, wherein said rod has a primary end and a secondary end, each of said primary end and said secondary end being coupled to a respective one of said straps at a point being located adjacent to said second end of said straps, a surface of said rod between said primary end and said secondary end being concave such that said surface flares extending towards said primary end and said secondary end from a center of said rod.

6. A cargo sled assembly for facilitating a user to drag cargo over a support surface, said assembly comprising:
    a dish having a rigid bottom wall wherein said bottom wall is configured to facilitate said dish to be dragged along a variety of support surfaces, said dish having a diameter of at least 40.0 inches wherein said dish is configured to accommodate cargo thereby facilitating said dish to transport the cargo, said dish having an outer wall extending upwardly from said rigid bottom wall, said outer wall having a distal edge with respect to said rigid bottom wall and an outer surface, said outer wall having a lip extending outwardly from said outer surface, said lip being aligned with said distal edge, said lip being coextensive with said distal edge, said rigid bottom wall comprises two adjacent layers, a perimeter edge of said rigid bottom wall being rounded extending around said rigid bottom wall, said perimeter edge protruding outwardly from a base of said rigid outer wall;
    a pair of straps, each of said straps being coupled to and extending laterally away from said dish, each of said straps having a first end and a second end, each of said having a first portion and a second portion, said first end being associated with said first portion, said second end being associated with said second portion, said first end of each of said straps being coupled to said lip, said straps being spaced apart from each other on said lip;
    a pair of buckles, each of said buckles having said first portion and said second portion of a respective one of said straps being slidably extended therethrough thereby facilitating each of said straps to have an adjustable length wherein said pair of buckles is configured to accommodate preference of a user; and a rod being coupled between each of said straps wherein said rod is configured to be gripped by a user thereby facilitating the user to drag said dish along the support surface for transporting the cargo in said dish, said rod having a primary end and a secondary end, each of said primary end and said secondary end being coupled to a respective one of said straps at a point being located adjacent to said second end of said straps, a surface of said rod between said primary end and said secondary end being concave such that said surface flares extending towards said primary end and said secondary end from a center of said rod.

\* \* \* \* \*